April 1, 1969 S. W. NEWELL 3,436,133
REMOVABLE STOP FOR THRUST BEARING SHOE
Filed April 17, 1967
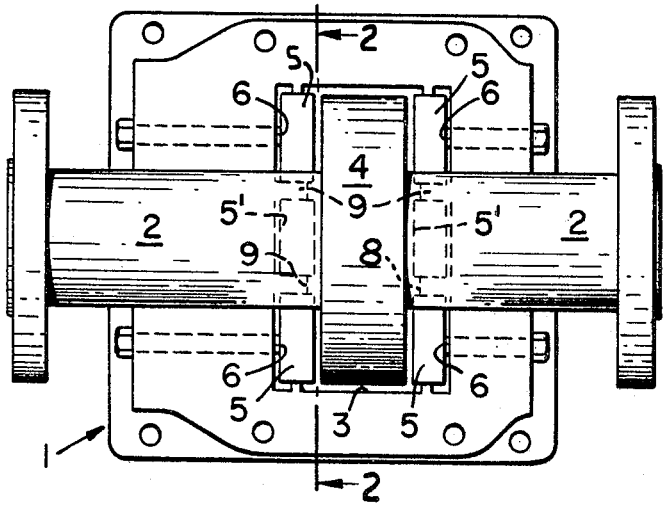
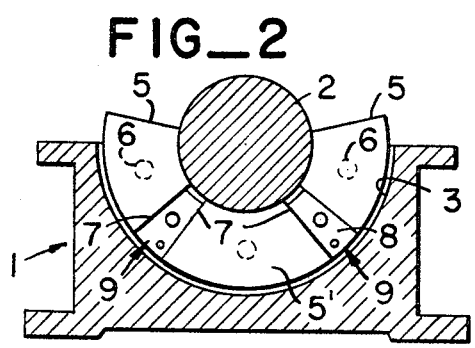
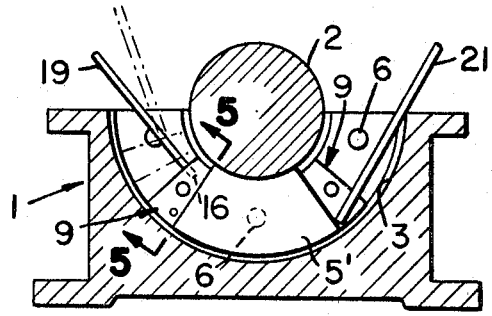
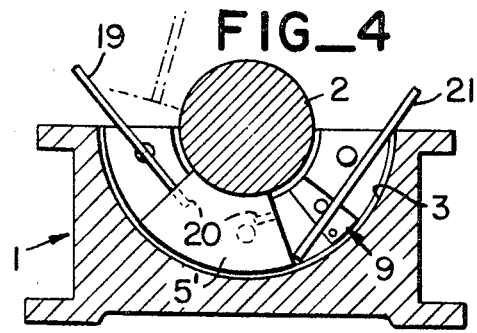
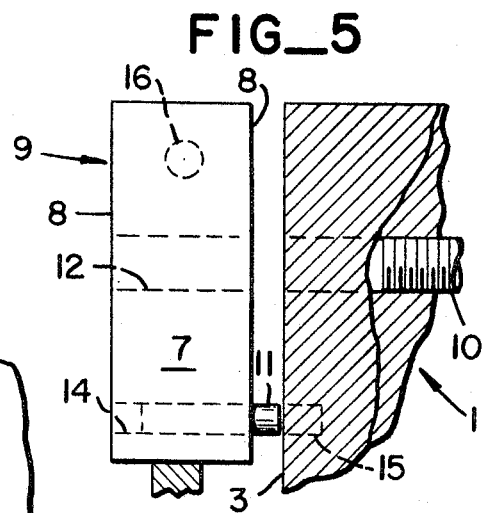
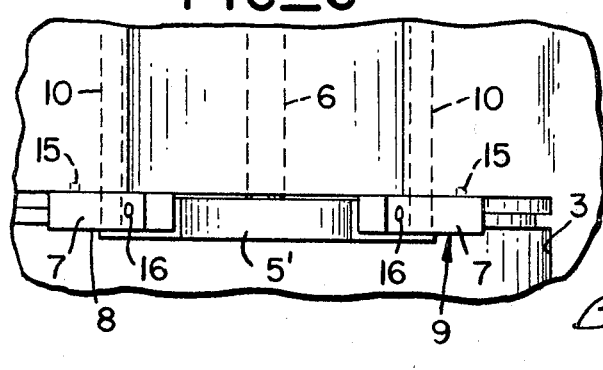
INVENTOR.
SIDNEY W. NEWELL
BY
Boyken, Mohler, Foster & Schlemmer
ATTORNEYS

United States Patent Office 3,436,133
Patented Apr. 1, 1969

3,436,133
REMOVABLE STOP FOR THRUST BEARING SHOE
Sidney W. Newell, 1301 Grand St.,
Alameda, Calif. 94501
Filed Apr. 17, 1967, Ser. No. 631,370
Int. Cl. H02k 17/00, 47/18, 47/22
U.S. Cl. 308—166     3 Claims

ABSTRACT OF THE DISCLOSURE

A thrust bearing wherein the area of the thrust shoes is increased, thereby increasing the capacity of the thrust bearing, by the addition of segmental thrust shoes in heretofore relatively inaccessible areas, which areas are now made readily accessible by a removable thrust shoe stop.

---

The thrust bearing contemplated for use herein is of the pivoted segmental type which has a broad range of application in such things as ships, pumps, water wheels, etc. Such a thrust bearing may be positioned along a shaft between a drive means and the point at which the work of the drive means is done and the purpose of such bearing is to prevent thrust which may be generated at the point of work from being transmitted back to the drive means.

In the example of a ship, the ship's engine may drive a shaft which leads to a propeller. At the propeller, its actuation in water creates a propelling thrust on the drive shaft in the direction of movement of the ship. This thrust, transmitted back to the ship's engine, would not only diminish the power of the engine but also be destructive thereof. Thus, a thrust bearing is positioned along the shaft between the ship's engine and propeller.

The normal thrust bearing includes a foreshortened shaft with a radially outwardly extending thrust collar formed therewith or secured thereto. The thrust collar is included within a housing which contains load carrying or thrust shoes which are so positioned and adapted as to receive and distribute in concentrated form the thrust load from the thrust collar.

The capacity of a thrust bearing is measured in terms of its load carrying ability. In order to increase the capacity of a thrust bearing it is necessary to increase the thrust area by increasing the areas of the thrust shoes and thrust collar. This can be done by either the addition of the thrust shoes which increases the area of load distribution or by a total increase in the diameter in the thrust collar and thereby size of the entire thrust bearing or increasing thrust pressure.

In many thrust bearing applications it is necessary to have thrust shoes for load distribution for only one side of the thrust collar; however, in an application such as a ship, where the vessel may go either forwardly or rearwardly, it is necessary to have thrust shoes on each side of the thrust collar. In some examples, the thrust load from one direction may be greater than the thrust load from the other direction; therefore, a larger load absorption area or more thrust shoes would be necessary on the one side than on the other of the thrust collar.

In some applications increased thrust shoe area has been accomplished by relatively complicated arrangements of segmental thrust shoes completely surrounding the thrust bearing shaft. Uniform load distribution is somewhat difficult to achieve with such arrangements and even more difficult is the servicing, cleaning, and replacing of individual thrust shoes.

It is a main object of this invention to conveniently increase the capacity of the given thrust bearing by the addition of thrust shoes of standard manufacture and mountings.

Another such object of this invention is the addition of thrust shoes to increase the capacity of a thrust bearing, which shoes can be fully serviced, removed, and if necessary replaced in restricted areas where the thrust shoes would otherwise be inaccessible.

Another such object of this invention is the provision of thrust shoe mounting means whereby all of the thrust shoes of the given bearing can be removed from the housing of a bearing without the necessity of removing the thrust bearing shaft and collar from the bearing block.

Other objects and advantages of the present invention will be obvious from the description taken in conjunction with the following drawings in which:

FIG. 1 is a top plan view of a thrust bearing of the type contemplated herein with the top of the bearing block removed to expose the thrust shaft and collar and the thrust shoes;

FIG. 2 is a sectional view taken substantially along line 2—2 of FIG. 1;

FIGS. 3 and 4 are views similar to FIG. 2 illustrating the removal of thrust shoes stops and thrust shoes with the thrust collar and shaft in place;

FIG. 5 is a sectional view taken substantially along line 5—5 of FIG. 3 illustrating the mounting of a removable thrust shoe stop;

FIG. 6 is an enlarged top plan view of a portion of FIG. 1 illustrating the positions of thrust shoes stops and a central thrust shoe with the thrust collar and shaft removed.

In general, and referring to FIG. 1, the thrust bearing illustrated includes a block generally indicated 1, the top of which is not shown. Bearing block 1 rotatably cradles a bearing shaft 2 therein. Since a thrust bearing is not primarily a heavy load supporting bearing, shaft 2 need not be mounted in shaft bearings but in cases where unusually heavy loads may be applied to shaft 2 said shaft may be mounted in block 1 in radial bearings.

Intermediate the ends of bearing shaft 2 and received within a complementary formed well 3 in bearing block 1 is a radially outwardly extending thrust collar 4 which may be integrally formed with shaft 2. Well 3 may have a generally arcuately formed bottom wall and a pair of parallel sidewalls.

Shaft 2 is adapted to slide slightly longitudinally of block 1 and bringing the thrust applied to said shaft to bear on load carrying or thrust shoes 5 through collar 4. Thrust shoes 5 are illustrated in FIG. 1 on each side of collar 4 as would be the case when thrust may be applied to shaft 2 in either forward or rearward directions. In the case where thrust is applied to shaft 2 from one direction only thrust shoes are needed only on the side of the thrust collar in the direction in which the thrust is applied.

Since the function of thrust shoes is to uniformly absorb the thrust load applied to collar 4 through shaft 2, adjustable thrust load pins 6 are provided, one for each thrust shoe. Changes in thrust load distribution such as that caused by wear may be compensated for by adjustment of the thrust load pins 6 which may be screw-threaded in block 1 and movable longitudinally thereof.

Illustrated in FIG. 1 to the left-hand side of thrust collar 4 are three thrust shoes 5. It will be noted that on the right-hand side of thrust collar 4 there are only two such thrust shoes 5. Such an application may very well be found in a ship wherein the left-hand end of a thrust bearing illustrated in FIG. 1 may be in the direction of forward movement of such ship while the right-hand end of such thrust bearing may be in the direction of rearward movement of such ship. Forward direction being the most common direction of movement and the speeds involved therein in being greater, greater thrust load distribution area is provided by the additional thrust shoe in the direction of forward movement.

In order to clean the inside of the thrust bearing or remove and clean or replace the thrust shoes 5 it is necessary to remove the top of bearing block 1 exposing the inside of the thrust bearing substantially as is shown in FIG. 1. The thrust shoes 5 illustrated full line (FIGS. 1 and 2) can then be rotated out of well 3 around shaft 2 and removed from the bearing for cleaning or replacement. However, a central thrust shoe such as 5' cannot be so removed. Thrust shoe stops 9, necessary to maintain the thrust shoes in their relative positions, prevent the removal of central thrust shoes.

In the past it has been necessary to detach thrust bearing shaft 2 from its connecting shafts (not shown) and lift shaft 2 out of block 1 in order to gain access to centrally located thrust shoes therebelow. This process involves substantial time, labor and equipment due to the great weight of thrust bearing shafts. In many instances the task has been a practical impossibility where the thrust bearing has of necessity been located in inaccessible cramped quarters where the lifting equipment required for a thrust bearing shaft cannot be used.

The present invention overcomes these past difficulties by providing a method and apparatus for removing at least one thrust shoe stop from its obstructing position to the removal of central thrust shoes. In the past thrust shoe stops have been integrally formed with the block of a thrust bearing in the casting thereof. So formed, such stops where not removable and the only way to get to a centrally located segmental thrust shoe was by removal of the thrust bearing shaft.

Thrust shoe stops 9 are wedged shaped segmental blocks which are adapted to be positioned between pairs of thrust shoes 5. As can be seen in FIGS. 1 and 6 the inwardly facing surfaces 8 of thrust shoe stops 9, with respect to well 3, terminate short of the correspondingly inwardly facing surfaces of thrust shoes 5 and 5'. Thrust shoe stops 9 are of generally the same configuration as the aforementioned integrally formed thrust shoe stops which have long been in use. They include a pair of non-parallel surfaces 7, a pair of parallel surfaces 8, and a pair of arcuate surfaces adjacent shaft 2 and the arcuate bottom wall of well 3 respectively.

Thrust shoe stops 9 are mounted and held in place by means of a threaded bolt and a positioning pin 11 (FIG. 5). Bolt 10 extends into well 3 from outside of block 1 and is received in a threaded bore 12 extending through thrust shoe stop 9, preferably nearer one arcuate surface than the other. When bolt 10 is threaded into bore 12, thrust shoe stop 9 is drawn into close and secure engagement with the parallel sidewall of well 3 adjacent thereto.

A second bore 14 extends through block 9 terminating at parallel surfaces 8 and is parallel to bore 12 but nearer the opposite arcuate surface of block 9 from bore 12. Received in bore 14 is the positioning pin 11, a portion of which extends outwardly of stop 9 in the direction of the mating surface of said parallel sidewall of well 3; in which surface is a complementarily formed bore 15 adapted to receive the extending portion of pin 11 when bolt 10 is threaded into bore 12 and draws block 9 against said sidewall of well 3. Positioning pin 11 may be held in place in bore 14 in any conventional manner such as by press fit, threading, or a set-screw.

It can be seen that pin 11 can extend outwardly of either side of block 9 and bolt 10 can be threaded into bore 12 from either side of block 9. Thus, thrust shoe stops of a single specification can be used in any desired position in a single thrust bearing by using either parallel surface 8 of stop 9 as the mating surface with a complementary sidewall of well 3 and extending pin 11 outwardly of stop 9 from that surface.

At a convenient position near the small end of wedge-shaped stop 9 there is formed a threaded working bore 16, through one of the non-parallel surfaces 7, which is adapted to receive therein the threaded end of a working rod 19 (FIG. 3). For convenient shop practice, working bore 16 can be formed normal to surface 7. Similar working bores 20 (FIG. 4) may be formed in the central thrust shoe 5. The purposes of working bores 16 and 20 and working rod 19 will be fully explained in conjunction with the operation and method of removing thrust shoe stops and centrally located thrust shoes beneath a thrust bearing shaft 2 without the necessity of removing such shaft.

Illustrated in FIG. 2 are the normal positions of a thrust bearing shaft 2, thrust shoes 5, thrust shoe stops 9, and the centrally located intermediate thrust shoe 5' within the well 3 of a thrust bearing block 1.

Side thrust shoes 5 can be removed from well 3 simply by rotating them therefrom in an upwardly direction and lifting them free of well 3 and shaft 2 for servicing or replacement. Then, from the most accessible side of thrust bearing block 1, the non-parallel surface 7 of thrust shoe stop 9 having working bore 16 therein is exposed and working rod 19 can be secured to thrust shoe stop 9 as by threading it into bore 16.

Bolt 10, holding stop 9 in place against the wall of well 3, may then be unscrewed forcing stop 9 away from the wall of well 3 a sufficient distance to clear positioning pin 11 from bore 15 in wall of well 3 and freeing thrust shoe stop 9 for removal from well 3.

When free from bolt 10 and the engagement of pin 11 in bore 15, thrust shoe stop 9 is then removed from well 3 in much the same manner as thrust shoes 5 by rotating it from well 3 around shaft 2. In FIG. 3 thrust shoe stops 9 and working rod 19 are shown in full line position ready for removal from well 3, and dot-dash line position in the process of being rotated out of well 3 around shaft 2.

With one thrust shoe stop 9 removed from well 3, intermediate thrust shoe 5' can then be removed by engaging it from the side opposite removed thrust shoe stop 9 with a second working rod 21 and pushing, rotating central thrust shoe 5' outwardly of well 3 around shaft 2 a sufficient distance for working rod 19 to be secured in working bore 20 formed in a convergent surface of thrust shoe 5'. FIG. 3 illustrates working rod 21 in place to push central thrust shoe 5', there being sufficient clearance between thrust collar 4 and the second thrust shoe stop 9, which may remain in place or be integrally formed with block 1, to insert rod 21 into engagement with the portion of thrust shoe 5' which extends beyond the surface 8 of thrust shoe stop 9 (FIG. 6).

In FIG. 4 rod 21 has been pushed and thrust shoe 5' rotated a sufficient distance so that working rod 19 can be threaded into working bore 20. Central thrust shoe 5' can then be rotated out of well 3 in the same manner as removable thrust shoe stop 9 for servicing or replacement.

It can be seen that it is necessary to have only one of thrust shoe stops 9 mounted for removal from well 3 and the other thrust shoe stop can be integrally formed with bearing block 1 as has been the practice in the past. However, if desired, both thrust shoe stops 9 can be removable though only one need be removed in a thrust shoe servicing or replacement operation.

It can be seen that the ability to remove a central thrust shoe such as thrust shoe 5' by being able to remove one of the thrust shoe stops from either side thereof eliminates the necessity of removing thrust bearing shaft 2 and the attendant difficulties therewith including the labor, time and apparatus required to disconnect shaft 2 from the drive shaft in which it may be connected and lift said shaft from thrust bearing block 1.

In some installations where the quarters in which a thrust bearing may be housed are limited, the problem of removing and servicing or replacing a centrally located thrust shoe such as thrust shoe 5' has proven to be a practical impossibility. In such instances the working space precludes the use of the apparatus necessary to lift the weighty shaft out of the thrust bearing block after the top of the block has been removed. In such installations it will be a relatively uncomplicated task to completely service all thrust shoes by being able to remove at least one of the thrust shoe stops as above described.

It is obvious that the method of removing an intermediate thrust shoe from the four sided arcuate passageway formed by the circumferential surface of shaft 2 and the complementary arcuate bottom of well 3 on two opposed sides, and by a parallel sidewall of well 3 and a lateral surface of collar 4 on the other two opposed sides is not restricted to the use of working rods and working bores formed in the thrust shoe stops and intermediate thrust shoes in the removal of said stops and shoes. Under the proper circumstances a removable thrust shoe stop and intermediate thrust shoes may just as well be engaged by a magnet or the like for rotation out of said passageway. Whatever the means for engaging a removable thrust shoe stop and intermediate thrust shoe, they can be removed from said passageway without disconnecting and removing thrust bearing shaft 2 from block 1.

It is to be understood that the above detailed description disclosed only the preferred form and steps involved in the present invention and is not intended to be limiting as other forms of removable thrust shoe stops and slightly different methods of removing the centrally located thrust shoe may occur to those skilled in the art, which forms and methods would not depart from the spirit of this invention and which would come within the scope of the appended claims.

I claim:

1. In a thrust bearing including a bearing block, a bearing shaft rotatably supported in said block and having intermediate the ends thereof a collar secured thereto and extending radially outwardly thereof into a well in said block, thrust shoes removably interposed between a side of said thrust collar and a wall of said well, and thrust shoe stops supported on said wall for positioning said shoes around and beneath a portion of the circumference of said shaft:

(a) means for removably supporting at least one of said thrust shoe stops on said wall;
(b) a thrust shoe stop so supported;
(c) said means including a bolt extending through said block and said wall and received and, releasably secured in a bore formed in said one thrust shoe stop for releasably supporting said one thrust shoe stop on said wall.

2. The invention defined in claim 1, including:

(d) a positioning pin extending outwardly of said one thrust shoe stop at a position remote from said bore and into a complementarily formed bore in said wall for maintaining said one thrust shoe stop in a predetermined position.

3. The invention defined in claim 1 up to but not including paragraph (c) or the limitation thereof, including:

(c) a working bore formed in a surface of said thrust shoe stop and adapted to be engaged by a working rod for removing said thrust shoe stop from its position on said wall.

References Cited
UNITED STATES PATENTS

| | | | |
|---|---|---|---|
| 2,558,262 | 6/1951 | Maxwell et al. | 308—160 |
| 2,779,637 | 1/1957 | Schaefer | 308—160 |
| 3,201,184 | 8/1965 | Hill | 308—160 |
| 3,271,088 | 9/1966 | Latham et al. | 308—160 |

CARROLL B. DORITY, JR., *Primary Examiner.*

U.S. Cl. X.R.

308—160